United States Patent [19]
Williams

[11] Patent Number: 4,915,586
[45] Date of Patent: Apr. 10, 1990

[54] PROPFAN BLADE ATTACHMENT

[75] Inventor: James R. Williams, Martinsville, Ind.

[73] Assignee: General Motors Corporation, Detroit, Mich.

[21] Appl. No.: 246,832

[22] Filed: Sep. 20, 1988

[51] Int. Cl.⁴ .............................................. B64C 11/28
[52] U.S. Cl. ...................................... 416/89; 416/142; 416/129; 416/171
[58] Field of Search ........... 416/142 R, 143 R, 129 R, 416/88, 89

[56] References Cited

U.S. PATENT DOCUMENTS

| | | | |
|---|---|---|---|
| 2,026,885 | 1/1936 | Goddard | 244/25 |
| 2,233,031 | 2/1941 | Price | 60/96 |
| 2,808,116 | 10/1957 | Kapelski | 416/142 |
| 2,981,339 | 4/1961 | Kaplan | 416/142 |
| 2,990,149 | 6/1961 | Samms | 416/142 X |
| 3,016,217 | 1/1962 | Polleys et al. | 416/142 X |
| 3,087,553 | 4/1963 | Kostyun | 416/129 A X |
| 3,175,619 | 3/1965 | Reed | 416/142 X |
| 3,669,371 | 6/1972 | Romhild et al. | 244/7 |
| 3,903,801 | 9/1975 | Senoski | 416/142 X |
| 3,957,229 | 5/1976 | Davis | 416/142 X |
| 4,394,109 | 7/1983 | Ritchie | 416/142 |

FOREIGN PATENT DOCUMENTS

| | | | |
|---|---|---|---|
| 2421627 | 11/1975 | Fed. Rep. of Germany | 416/142 |
| 2605679 | 4/1988 | France | 416/171 |
| 612062 | 6/1978 | U.S.S.R. | 416/142 |
| 1024742 | 4/1966 | United Kingdom | 416/142 |
| 2129502 | 5/1984 | United Kingdom | 60/268 |

Primary Examiner—Everette A. Powell, Jr.
Attorney, Agent, or Firm—Saul Schwartz

[57] ABSTRACT

A blade attachment between a propfan blade and a propfan hub in a propfan propulsion system for a tube-launched expendable aircraft, the attachment including a hinger on a rotatable propfan hub on the aircraft, a stem of the propfan blade rotatably supported on the hinge, a pitch control arm rigidly attached to the propfan blade, and a pitch control link universally articulated at opposite ends to the pitch control arm and to the propfan hub. When the hinge is extended, the pitch control arm and pitch control link locate the propfan blade in a folded position generally flat against the fuselage of the aircraft for storage in and launch from a tube. After launch, the hinge rotates to a retracted position and the pitch control arm and pitch control link concurrently rotate the propfan blade to an unfolded position for propelling the aircraft forward when the propfan hub rotates.

4 Claims, 2 Drawing Sheets

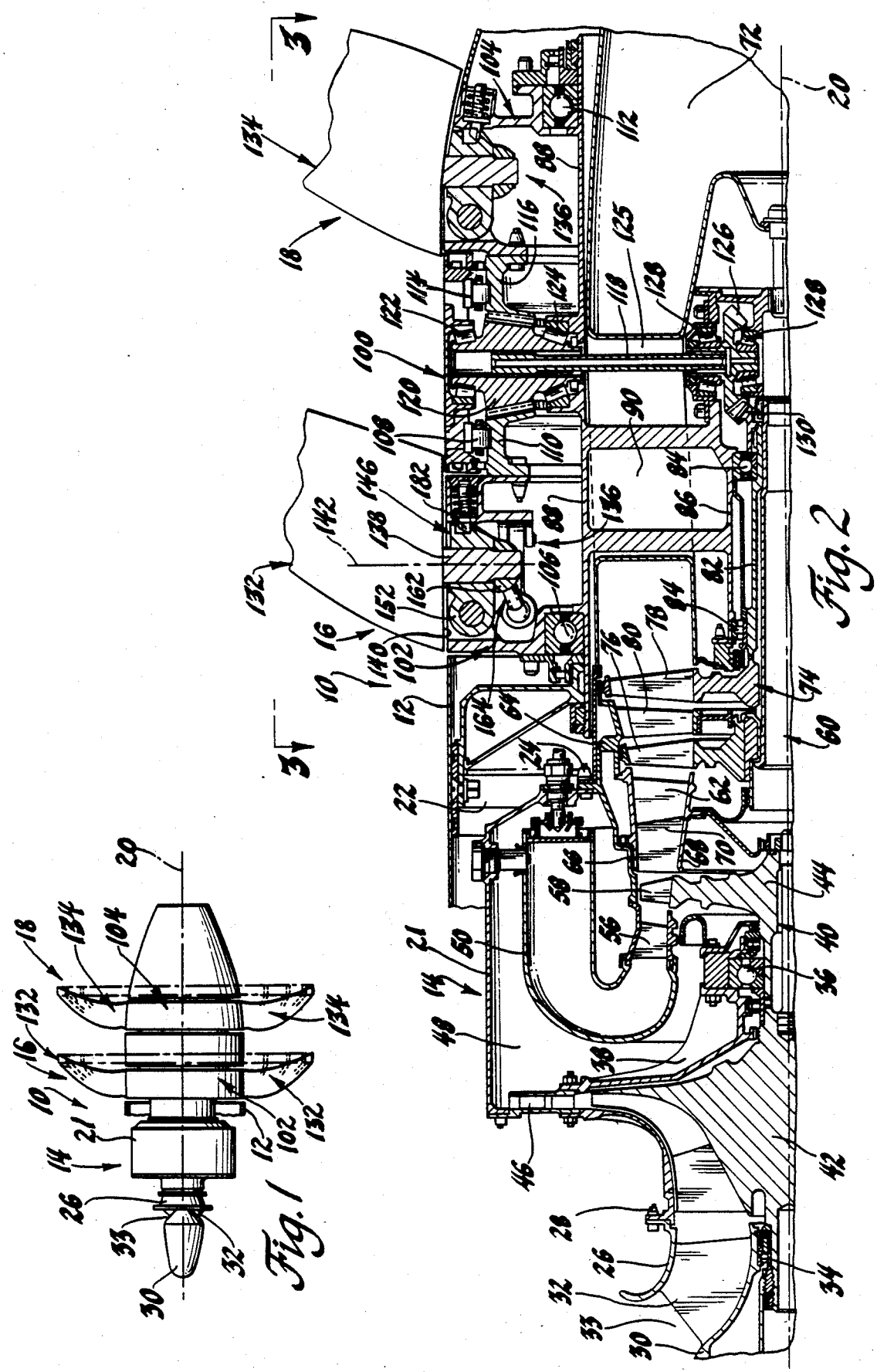

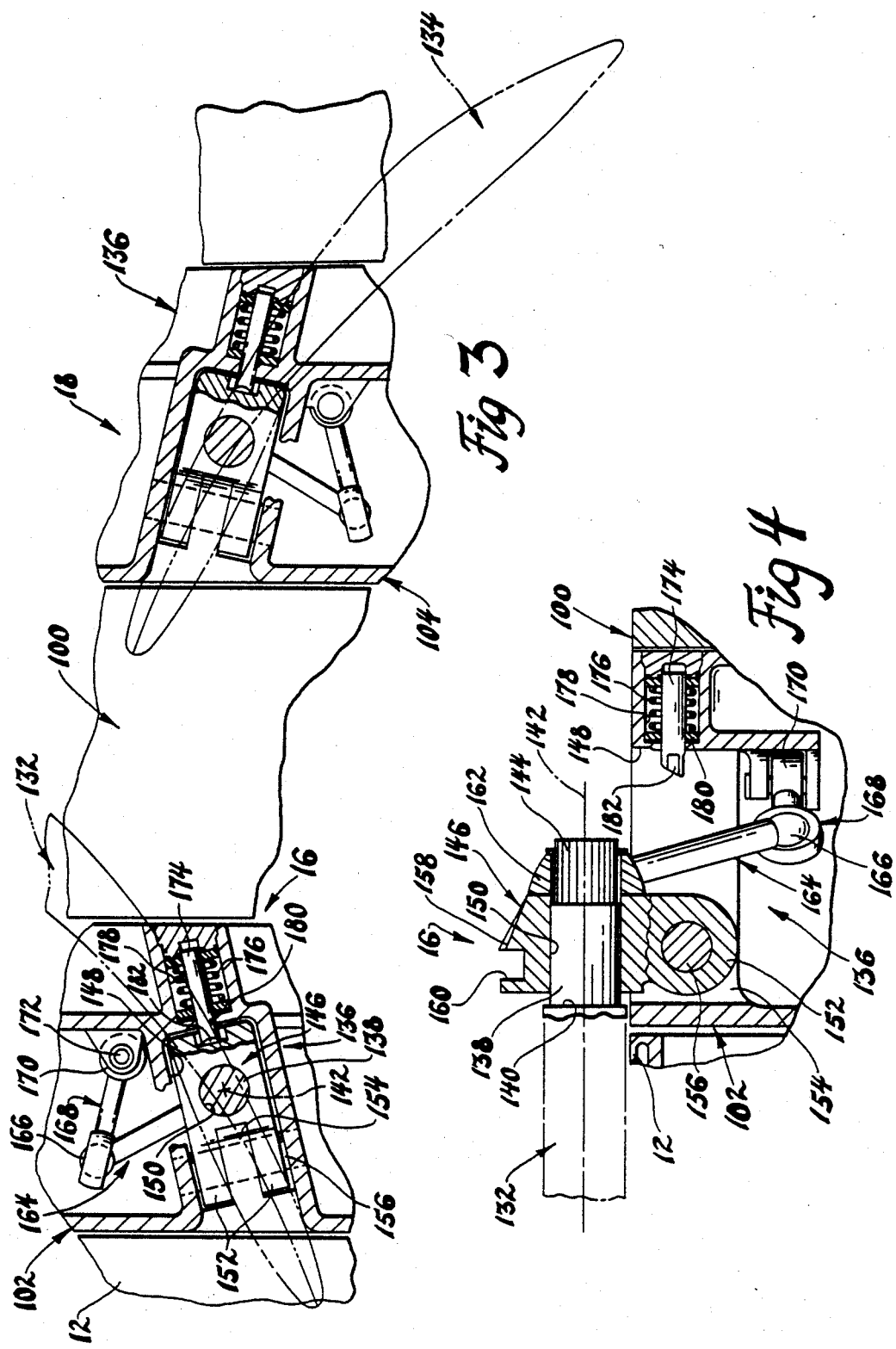

PROPFAN BLADE ATTACHMENT

FIELD OF THE INVENTION

This invention relates generally to propfan propulsion systems for aircraft and, in particular, to systems for attaching propfan blades to propfan rotor hubs.

BACKGROUND OF THE INVENTION

Propfan propulsion systems for aircraft, also known variously as unducted fan and ultra-high bypass ratio systems, typically include a turboshaft gas turbine engine driving one or more rotors to which are attached a plurality of relatively thin, relatively highly curved propfan blades. As compared to conventional propeller systems, propfan systems achieve comparable or better propulsive efficiencies at aircraft mach numbers below .85. As compared to modern turbofan propulsion systems, propfan systems achieve greater propulsive efficiencies at comparable aircraft mach numbers. For tube-launched expendable vehicles, where aircraft range is a primary consideration, propfan propulsion represents a potentially attractive alternative to currently used turbofan propulsion. For such a system to be practical, however, the propfan blades must be attached to the rotor hubs through connections which permit flat storage of the blades prior to launch and rapid, automatic, and dependable deployment to permanently extended positions immediately after launch. A propfan blade-to-hub connection according to this invention responds to these requirements.

SUMMARY OF THE INVENTION

This invention is a new and improved connection between a propfan blade and a propfan rotor in an aircraft propfan propulsion system. In the blade-to-rotor connection according to this invention, a propfan blade is mounted on a hinge for rotation about a principal axis of the blade and the hinge is mounted on the propfan rotor for rotation about a hinge axis of the rotor. A pitch control linkage is disposed between the propfan blade and the rotor and includes a pitch control arm rigidly attached to the blade and a pitch control link rotatably articulated at opposite ends to the pitch control arm and to the rotor. When the hinge is in an extended position, the pitch control linkage locates the propfan blade in a folded position generally flat against the cylindrical fuselage of the aircraft for efficient storage within a tube-like launch container with the tip of the propfan blade facing forward. When the hinge is in a retracted position disposed generally within a pocket in the rotor, the pitch control linkage locates the propfan blade in an unfolded position wherein its principal axis is generally radial and the blade is pitched to propel the aircraft forward when the rotor rotates. When the aircraft is launched from the tube-like container, the airstream around the blade provides the motive force for moving the propfan blades from their folded to their unfolded positions. Distal ends of a plurality of spring biased plungers on the rotor engage respective cam channels on the hinges and are stroked against the springs as the hinges move from the extended to the retracted positions to retard the angular velocity of the hinges. The distal ends of the plungers project into pockets at the ends of the cam channels to locate and latch the hinges in the retracted positions.

BRIEF DESCRIPTION OF THE DRAWINGS

FIG. 1 is a fragmentary elevational view of an aircraft having a propfan propulsion system wherein the propfan blades are attached to the rotors through connections according to this invention and showing the blades in their unfolded positions;

FIG. 2 is an enlarged, partially broken away view of the propfan propulsion system illustrated in FIG. 1;

FIG. 3 is a view taken generally along the plane indicated by lines 3—3 in FIG. 2; and FIG. 4 is an enlarged view of a portion of FIG. 2 showing a propfan blade in a folded position.

DESCRIPTION OF A PREFERRED EMBODIMENT

Referring to FIGS. 1 and 2 of the drawings, an expendable aircraft 10 has a generally cylindrical fuselage 12 and a turboshaft gas turbine engine 14 within the fuselage which drives a front propfan rotor assembly 16 and an aft propfan rotor 18. The engine 14 and the propfan rotors 16 and 18 are aligned on a longitudinal or fore-and-aft rotor axis 20 of the aircraft 10. The propfan rotors propel the aircraft in a "pusher" mode toward the left as viewed in FIGS. 1 and 2.

The gas turbine engine 14 is representative of turboshaft gas turbine engines generally and includes a cylindrical engine housing or case 21 rigidly attached to an annular strut 22 of the fuselage 12 at an annular array of bolts 24. An annular air inlet housing 26 is rigidly connected to the housing 21 at a circumferential array of bolts 28 and, in turn, rigidly supports a center body 30 on the axis 20 through a plurality of radial struts 32. An annular air inlet flow path 33 around the axis 20 is defined between the housing 26 and the centerbody 30. Ducts, not shown, direct ambient air from outside the fuselage to the inlet flow path.

A front bearing 34 on the center body 30 and an aft bearing 36 supported on a wall 38 of the engine case 21 cooperate in supporting a gasifier rotor 40 of the engine on the case for rotation about the longitudinal axis 20. The gasifier rotor includes a single stage centrifugal compressor 42 and a single stage gasifier turbine 44 rigidly coupled to the compressor radially inboard of the bearing 36. Air in the flow path 33 is forced by the centrifugal compressor 42 through a diffuser 46 and into a compressed air plenum 48 surrounding a reverse flow annular combustor 50. Hot gas motive fluid generated in the combustor 50 is directed aft through an annular nozzle 56 and through a single stage of turbine blades 58 on the turbine 44.

A power turbine portion 60 of the engine 10 is located aft of the gasifier turbine 44 and includes an annular nozzle 62 connected to the engine case 21 through a radial flange 64. The nozzle 62 has a forwardly extending outer shroud 66 and a forwardly extending inner shroud 68 which cooperate to define the forward end of an annular hot gas flow path 70 around the axis 20 which extends from the gasifier turbine 44 to an exhaust nozzle 72.

The power turbine portion 60 of the engine further includes a two-stage power turbine 74 having a first stage of turbine blades 76 immediately aft of the nozzle 62 and a second stage of turbine blades 78 separated from the first stage by a stage of stator vanes 80 rigidly connected to the engine case through the radial flange 64. A tubular engine output shaft 82 is rigidly connected at its forward end to the power turbine 74 and is supported for rotation about the axis 20 by a pair of bearings 84 mounted on an inner annular support web 86. The inner support web 86 is rigidly connected to an outer annular support web 88 through a plurality of struts which extend radially across the hot gas path 70, only a single strut 90 being illustrated in FIG. 2. The outer annular support web 88 is connected to the fuselage 12 of the aircraft through the struts 22 so that the inner and outer support webs 86 and 88 are rigid extensions of the fuselage.

An outward extending radial flange, not shown, integral with the outer annular support web 88 terminates in an annular intermediate support member 100 between the propfan rotor assemblies 16 and 18. The front propfan rotor assembly 16 includes and annular fan hub 102. The aft propfan rotor assembly 18 includes a similiar annular fan hub 104. The hub 102 is supported on the fuselage 12 for rotation about the axis 20 by a bearing 106 between the hub and the outer support web 88 and by a bearing 108 between the intermediate support member 100 and a first ring gear 110 bolted to the aft end of the hub 102. The hub 104 is supported on the fuselage 12 for rotation about the axis 20 by a bearing 112 between the hub and the outer annular support web 88 and by a bearing 114 disposed between the intermediate support member 100 and a second ring gear 116 bolted to the hub 104. The fan hubs 102 and 104 are independently rotatable about the axis 20 and the first and second ring gears are identical except for being arranged in mirror image fashion.

As seen best in FIG. 2, a plurality of transfer shafts are aligned on corresponding ones of a plurality of radial axes disposed in a common plane between the propfan rotor assemblies 16 and 18 perpendicular to the axis 20, only a representative transfer shaft 118 being illustrated in FIG. 2. An outer bevel pinion 120 is attached to the outboard end of the transfer shaft 118 and is rotatably supported on the fuselage 12 by a roller bearing 122 on the intermediate support member 100 and by a roller bearing 124 on the annular support web 88. The transfer shaft 118 extends through a shielded area 125 behind strut 90 for protection against hot gas in hot gas path 70. The transfer shaft 118 has an inner bevel pinion 126 attached thereto radially inboard of the annular hot gas path 70. The inner bevel pinion is supported on the fuselage 12 by a pair of roller bearings 128. The inner bevel pinion 126 meshes with a bevel gear 130 which is spline connected to the aft end of the tubular engine output shaft 82. The outer bevel pinion 120 meshes with each of the ring gears 110 and 116.

Hot gas in the hot gas path 70 rotates the power turbine stages 76 and 78 and the engine output shaft 82. The bevel gear 130 on the output shaft 82 drives the inner bevel pinion 126 whereby the transfer shaft 118 is rotated about its radial axis. The outer bevel pinion 120 likewise rotates so that the ring gear 110 is driven in a first direction about the axis 20 while the ring gear 116 is driven at the same speed but in the opposite direction.

The front propfan rotor assembly 16 includes a plurality of propfan blades 132. The rear propfan rotor assembly 18 includes a plurality of propfan blades 134. Each of the blades 132 and 134 is connected to its respective hub 102 and 104 through a blade attachment 136 according to this invention. For brevity, only one blade attachment 136 between a front blade 132 and the hub 102 of the propfan rotor assembly 16 is described below.

As seen best in FIG. 2-4, the blade attachment 136 includes a cylindrical stem 138 of the blade 132 projecting perpendicular to an inboard end 140 of the blade. The stem 138 is aligned on a principal axis 142 of the blade perpendicular to the inboard end 140. The stem has a plain journal portion between the inboard end 140 of the blade and a plurality of axial splines 144 at the end of the stem.

The blade attachment 136 further includes a hinge 146 disposed in a generally rectangular pocket 148 in the hub 102. The hinge 146 has a journal bore 150 therethrough and a pair of bifurcated lugs 152. The lugs 152 straddle a lug 154 on the hub 102. A hinge pin 156 projects across the width of the pocket 148 and through appropriate openings in the lugs 152 and 154 whereby the hinge 146 is mounted on the hub 102 for pivotal movement between a retracted position, FIGS. 2 and 3, wherein the hinge is disposed completely within the pocket 148 and an extended position, FIG. 4, rotated counterclockwise from the retracted position and projecting generally perpendicular to the cylindrical outside surface of the hub 102. The hinge 146 has an outside cam channel 158 thereon which terminates at a depression 160, FIG. 4.

The cylindrical journal of the stem 138 is closely received in the journal bore 150 of the hinge 146 whereby the propfan blade 132 is supported on the hinge for rotation relative to the hinge about its principal axis 142. A first end 162 of a pitch control arm 164 is rigidly attached to the stem 138 at the splines 144 on the latter so that the pitch control arm rotates as a unit with the propfan blade 132 about blade principal axis 142 relative to the hinge. A second end 166 of the pitch control arm 164 is universally articulated to a first end of a pitch control link 168, FIG. 3. A second end of the pitch control link 168 is universally articulated to the hub 102 through a ball and socket type joint 170 whereby the pitch control link is movable in limited universal joint fashion about a link attaching point 172, FIG. 3.

The pitch control arm 164 and the pitch control link 168 cooperate to define discrete positions of the propfan blade 132 relative to the hub 102 for each angular position of the hinge 146 relative to the hub 102. In particular, the pitch control arm and pitch control link locate the blade 102 in a folded position, FIG. 4, when the hinge 146 is in the extended position and in an unfolded position, FIG. 1-3, when the hinge is in the retracted position.

In the folded position, FIG. 4, the blade 102 is generally flat against the outside of the fuselage 12 so that the aircraft 10 may be stored in and launched from a tube-like container having a diameter only slightly larger than the diameter of the fuselage 12. In the unfolded position, the principal axis 142 is generally radial to the rotor axis 20 and the inboard end 140 of the blade closely faces the outside of the hub 102. In addition, in the unfolded position the blade 132 is pitched for optimum forward thrust when the hub rotates. In their unfolded positions, the blades 134 of the aft propfan rotor assembly are likewise pitched for optimum forward thrust but in mirror image fashion to the blades of the front propfan rotor assembly due to the opposite rotation of the hub 104.

The blade attachment 136 further includes a plunger 174 slidably disposed on the hub 102. A spring 176 in a bore 178 in the hub 102 bears against a washer 180 on the plunger 174. The spring 176 biases the plunger 174 to the left, FIGS. 2–4, urging a control end 182 of the plunger, FIG. 4, against the bottom of the channel 158 on the hinge. When the control end 182 is in the depression 160, the plunger locates and latches the hinge in the retracted position.

In their folded positions, the blades lay flat against the fuselage between the latter and the inside of the tube-like container. The blades extend forward from the pockets 148 in the hubs so that when the aircraft is launched from the container the airstream around the fuselage moves the blades from the folded to the unfolded positions. Prior to the aircraft being positioned in its tube-like container, a pyrotechnically releasable band, not shown, may be disposed around the folded blades, the band being jettisoned concurrently with launch of the aircraft from the container.

As the blade 132 moves from the folded toward the unfolded position, the cam channel 158 moves over the control end 182 of the plunger 174. The depth of the channel 158 is contoured to progressively stroke the plunger against the spring 176 whereby the plunger provides progressively increasing resistance to pivotal movement of the hinge 146 to the retracted position. Accordingly, the spring operates to cushion the terminal increments of angular movement of the hinge to reduce the shock to the hinge and to the blade 132 as the hinge achieves the retracted position. When the hinge achieves the retracted position, the control end 182 of the plunger 174 seats in the depression 160 to prevent further rotation of the hinge and to latch the hinge in the retracted position. Thereafter, the engine is ignited to initiate propulsive rotation of the propfan rotor assemblies 16 and 18 whereby the aircraft is propelled forward at flight speed.

The embodiments of the invention in which an exclusive property or privilege is claimed are defined as follows:

1. In A PROPFAN PROPULSION SYSTEM including
    a SUPPORT BODY having a cylindrical outside wall aligned on a longitudinal axis of said SUPPORT BODY,
    an annular propfan hub disposed on said SUPPORT BODY for rotation about said longitudinal axis, and
    a propfan blade having a folded position generally flat against said outside wall of said SUPPORT BODY for storage and an unfolded position generally perpendicular to said outside wall of said SUPPORT BODY for propelling said SUPPORT BODY when said propfan hub rotates,
    a propfan blade attachment comprising:
        a hinge on said propfan hub rotatable therewith about said longitudinal axis and relative thereto between an extended position corresponding to said folded position of said propfan blade and a retracted position corresponding to said unfolded position of said propfan blade,
        means connecting said propfan blade to said hinge for rotation relative thereto about a principal axis of said propfan blade and for rotation as a unit with said hinge between said extended and said retracted positions of said hinge,
        a pitch control arm having one end rigidly attached to said propfan blade for rotation as a unit therewith, and
        a pitch control link having a first end universally articulated to said pitch control arm at the other end thereof and a second end universally articulated to said propfan hub at a link attaching point on said propfan hub,
        said pitch control link and said pitch control arm cooperating to locate said propfan blade in each of said folded and said unfolded positions thereof when said hinge is in respective ones of said extended and said retracted positions.

2. The propfan blade attachment recited in claim 1 and further including
    latch means on said propfan hub and on said hinge for latching said hinge in said retracted position.

3. The propfan blade attachment recited in claim 2 and further including
    cushioning means between said hinge and said propfan hub for cushioning the terminal increments of movement of said hinge from said extended to said retracted position.

4. In A PROPFAN PROPULSION SYSTEM including
    a SUPPORT BODY having a cylindrical outside wall aligned on a longitudinal axis of said SUPPORT BODY,
    an annular propfan hub disposed on said SUPPORT BODY for rotation about said longitudinal axis with an outside wall thereof generally flush with said cylindrical outside wall of said SUPPORT BODY, and
    a propfan blade having a folded position generally flat against said outside wall of said SUPPORT BODY for storage and an unfolded position generally perpendicular to said outside wall of said propfan hub for propelling said SUPPORT BODY when said propfan hub rotates,
    a propfan blade attachment comprising:
        means on said propfan hub defining a pocket in said outside wall of said propfan hub,
        a hinge in said pocket on said propfan hub rotatable therewith about said longitudinal axis and relative thereto between an extended position projecting out of said pocket and corresponding to said folded position of said propfan blade and a retracted position within said pocket and corresponding to said unfolded position of said propfan blade,
        means on said propfan blade defining a cylindrical stem thereon aligned on a principal axis of said propfan blade,
        means supporting said stem on said hinge so the said blade is rotatable with said hinge between said extended and said retracted positions thereof and relative thereto about said principal axis of said blade,
        a pitch control arm having one end rigidly attached to said stem for rotation as a unit with said propfan blade about said principal axis thereof,
        a pitch control link having a first end universally articulated to said pitch control arm at the other end end thereof and a second end universally articulated to said propfan hub at a link attaching point on said propfan hub,
        said pitch control link and said pitch control arm cooperating to locate said propfan blade in each of said folded and said unfolded positions thereof when said hinge is in respective ones of said extended and retracted positions,
    means defining a cam channel on said hinge, a plunger on said propfan hub having a control end adapted to project into said cam channel as said hinge moves from said extended to said retracted position, spring means biasing said control end against a bottom of said cam channel, said spring means being compressed by said plunger to cushion said hinge as said hinge approaches said retracted position, and a depression in said hinge at the end of said cam channel for reception of said control end of said plunger when said hinge achieves said retracted position whereby said hinge is latched in said retracted position.

* * * * *